(12) United States Patent
Pawar et al.

(10) Patent No.: US 10,333,664 B1
(45) Date of Patent: Jun. 25, 2019

(54) SYSTEMS AND METHODS FOR DYNAMICALLY SELECTING WIRELESS DEVICES FOR UPLINK (UL) MULTIPLE-INPUT-MULTIPLE-OUTPUT (MIMO) PAIRING

(71) Applicant: Sprint Spectrum LP, Overland Park, KS (US)

(72) Inventors: Hemanth Pawar, Brambleton, VA (US); Shilpa X. Kowdley, Brambleton, VA (US); Chunmei Liu, Great Falls, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 85 days.

(21) Appl. No.: 15/268,877

(22) Filed: Sep. 19, 2016

(51) Int. Cl.
*H04L 5/00* (2006.01)
*H04B 7/0452* (2017.01)

(52) U.S. Cl.
CPC ......... *H04L 5/0037* (2013.01); *H04B 7/0452* (2013.01); *H04L 5/0094* (2013.01)

(58) Field of Classification Search
CPC ... H04L 5/0037; H04L 5/0094; H04L 5/0035; H04L 47/11; H04L 12/725; H04L 12/741; H04L 45/308; H04L 29/06; H04L 63/1433; H04L 63/1441; H04L 63/1408; H04L 63/20; H04L 1/0003; H04L 1/0009; H04L 1/0015; H04L 5/0023; H04L 5/0042; H04L 5/0046; H04L 41/5025; H04L 43/0882; H04L 47/20; H04L 1/20; H04L 27/26; H04L 27/2626; H04L 5/0051; H04L 27/2613; H04L 5/0073; H04L 5/0048; H04B 7/0452; H04B 1/707; H04B 17/382; H04W 24/08; H04W 28/02; H04W 28/0284; H04W 72/04; H04W 72/08; H04W 28/06; H04W 72/12; H04W 72/1226; H04W 72/0413; H04W 72/082; H04W 72/1231; G06F 15/173

See application file for complete search history.

(56) References Cited

U.S. PATENT DOCUMENTS

| | | | |
|---|---|---|---|
| 8,520,616 B2 | 8/2013 | Cui et al. | |
| 8,526,519 B2 | 9/2013 | Chen et al. | |
| 8,599,777 B2 | 12/2013 | Vitthaladevuni et al. | |
| 8,644,422 B2 | 2/2014 | Gao et al. | |
| 8,897,203 B2 | 11/2014 | Song et al. | |
| 2011/0044272 A1* | 2/2011 | Cui | H04B 7/0452 370/329 |
| 2013/0003583 A1* | 1/2013 | Landstrom | H04B 7/0452 370/252 |
| 2013/0039387 A1* | 2/2013 | Qu | H04L 5/0051 375/141 |
| 2013/0124719 A1* | 5/2013 | Espinosa | H04L 41/5025 709/224 |

(Continued)

*Primary Examiner* — Hardikkumar D Patel

(57) ABSTRACT

Systems and methods are described for selecting User Equipment(s) (UEs) for pairing in a cellular network. A channel orthogonality of one or more UEs may be determined at an Access Node (AN) for a condition. The one or more UEs may be inspected for a criteria. At least one of the one or more UEs whose data content meets the criteria may be scheduled with at least one other UE for Uplink (UL) Multi-User Multiple-Input-Multiple-Output (MU-MIMO) pairing.

9 Claims, 7 Drawing Sheets

(56) References Cited

U.S. PATENT DOCUMENTS

| | | | |
|---|---|---|---|
| 2014/0105048 A1 | 4/2014 | Tellado et al. | |
| 2015/0194039 A1* | 7/2015 | Martin | G08B 21/182 340/632 |
| 2015/0222526 A1* | 8/2015 | Baykal | H04L 45/308 370/352 |
| 2016/0173825 A1* | 6/2016 | Polyakov | H04N 7/155 348/14.03 |
| 2016/0308898 A1* | 10/2016 | Teeple | H04L 63/1433 |
| 2016/0353415 A1* | 12/2016 | Sarkar | H04W 72/042 |
| 2016/0380900 A1* | 12/2016 | Kolhi | H04L 47/2441 370/235 |
| 2017/0339708 A1* | 11/2017 | Rask | H04W 72/1226 |

\* cited by examiner

| Data Application/Protocol | UL MU-MIMO PAIRING PRIORITY |
|---|---|
| Web Browsing | L |
| E-mails (Outlook, Yahoo, Gmail) | L |
| Face Time | M |
| Skype | M |
| Periscope | M |
| Video Conference | M |
| Bit Torrent | L |
| You Tube Video Upload | H |
| Facebook Video Upload | H |
| Google Cloud Upload | H |

FIG. 4B

SYSTEMS AND METHODS FOR DYNAMICALLY SELECTING WIRELESS DEVICES FOR UPLINK (UL) MULTIPLE-INPUT-MULTIPLE-OUTPUT (MIMO) PAIRING

TECHNICAL BACKGROUND

As cellular networks develop, the want for high Quality of Service (QoS) coupled with a shortage of wireless spectrum makes it challenging for network operators to meet multiple users' bandwidth and/or throughput demands simultaneously. Heterogeneous Networks (HetNet) implement Multiple-Input-Multiple-Output (MIMO) schemes/technologies to exploit multipath propagation behaviors, for example, by enabling multiple transmit (Tx) and/or receive (Rx) antennas at Access Nodes (ANs) and/or User Equipment(s) (UEs) to transfer data at a same time (e.g., spatial multiplexing), which effectively increases signal-capturing power to improve link quality and reliability.

Under typical MIMO scheme(s), UEs are prioritized for pairing (i.e., "combined" or "co-scheduled" on a same Resource Block (RB) for Uplink (UL) transmission) based on channel orthogonality and/or a Signal-to-Interference-Plus-Noise (SINR) ratio, ignoring data usage factors, which reduces overall network efficiencies and cell-throughput.

Overview

Systems and methods are described for selecting UEs for UL MU-MIMO pairing in a cellular network. For example, a plurality of active UEs that meet a channel orthogonality condition may be detected. The plurality of UEs may be inspected at an inspection node using Deep Packet Inspection (DPI). A criteria may be determined for selecting at least one UE from the plurality of UEs for UL MU-MIMO pairing. The at least one UE may be scheduled for UL MU-MIMO pairing with at least one other UE when user content of the at least one UE meets the criteria.

In another instance, a channel orthogonality of multiple, parallel RF signals (or data streams) received at an AN from a plurality of UEs may be determined. At least one UE whose channel orthogonality meets a set threshold may be selected; The at least one UE is selected from the plurality of UEs based on data content. The AN may schedule the selected UE and at least one other UE to share a same set of RBs.

BRIEF DESCRIPTION OF THE DRAWINGS

FIG. 4B illustrates data applications/protocols used for prioritizing UE selection for UL MU-MIMO pairing in a cellular network.

DETAILED DESCRIPTION

As cellular networks develop, the want for high Quality of Service (QoS) coupled with a shortage of wireless spectrum makes it challenging for network operators to meet multiple users' bandwidth and/or throughput demands simultaneously. Heterogeneous Networks (HetNet) use Single-User and/or Multi-User Multiple-Input-Multiple-Output (SU/MU-MIMO) enabled transmit (Tx) and/or receive (Rx) antennas deployed at Access Nodes (ANs) and/or User Equipment(s) (UEs) dispersed throughout the cellular network to exploit multipath propagation behaviors. For example, referring to FIG. 1A, multiple SU/MU-MIMO enabled Tx/Rx antennas 124, 126 may be deployed at AN 110 and/or UEs 102, 106 of cellular network 120 such that multiple, parallel Radio Frequency (RF) signals (or data streams) sent to/from UEs 102, 106 at different times and/or from different paths may be "combined" on a same Resource Block (RB) for Uplink (UL) transmission (e.g., using spatial multiplexing), which effectively increases signal-capturing power (i.e., more bits per second per frequency range or Hertz (Hz) of bandwidth) at AN 110 and/or UEs 102, 106 to improve link quality and/or reliability (i.e., reduce fading).

Figure 1A:
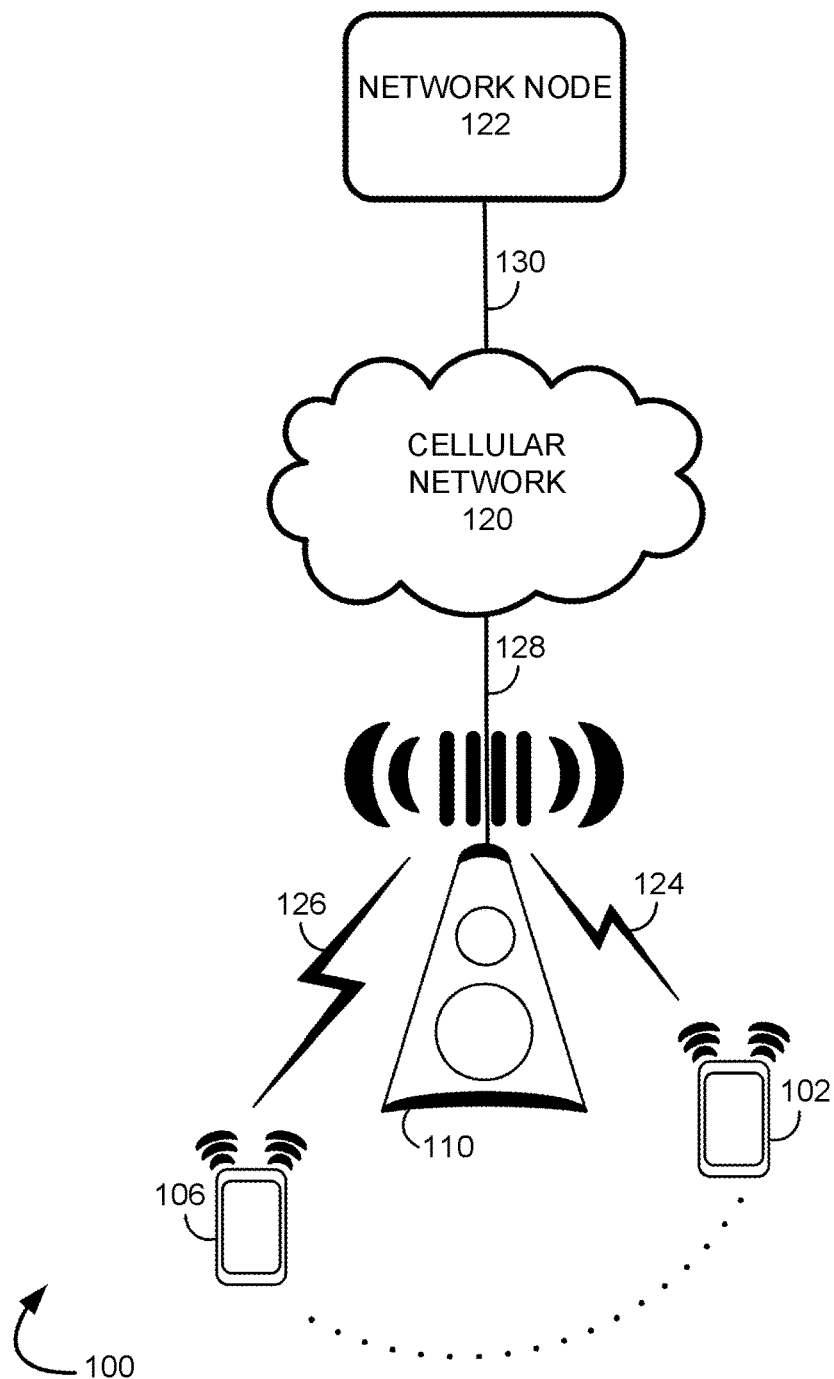
FIG. 1A illustrates an exemplary communication system for prioritizing UE selection for Single-User and/or Multi-User Multiple-Input-Multiple-Output (SU/MU-MIMO) pairing in a cellular network.
Figure 1B:
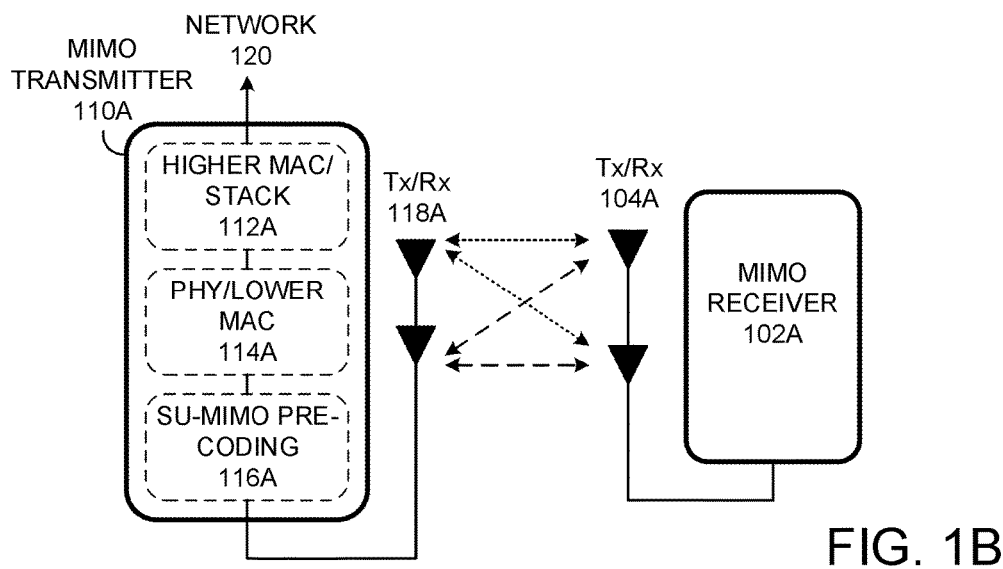
FIG. 1B illustrates an AN of the exemplary communication system illustrated in FIG. 1A operating in SU-MIMO mode.

Referring to FIG. 1B, multiple SU-MIMO enabled Tx/Rx antennas 104A, 118A are deployed at AN 110A to exploit multipath propagation behaviors (e.g., spatial domain) and/or to support spatial multiplexing, beamforming, and/or transmit diversity. For example, multiple SU-MIMO enabled Tx/Rx antennas 104A, 118A may be deployed at AN 110A and/or a single UE 102A of cellular network 120 such that multiple, parallel RF signals (or data streams) are sent to/from UE 102A at a same time to increase data throughput (i.e., point-to-point). On the Downlink (DL), the RF signals may be spatially pre-coded (i.e., amplitude/phase scaling may be applied to the RF signals) and sent to the single UE 102A from AN 110A via multiple SU-MIMO enabled Tx/Rx antennas 104A, 118A. UE 102A uses the multiple, spatially pre-coded RF signals, which arrive at UE 102A from AN 110A with different spatial signatures, to recover RF signals destined for the UE 102A. On the UL, UE 102A can send multiple, spatially pre-coded RF signals to AN 110A; the multiple, spatially pre-coded RF signals are used to identify a source, for example, UE 102A, for each spatially precoded RF signal.

AN 110A may include, for example: a higher Media Access Control (MAC) stack module 112A configured to schedule UE 102A for an SU-MIMO operation based on Channel State Information (CSI) sent to AN 110A from UE 102A via SU-MIMO enabled Tx/Rx antennas 104A, 118A; a lower MAC stack module 114A configured to perform data handling functions (e.g., multiplexing, de-multiplexing, modulation, and/or de-modulation) of the RF signals sent to AN 110A from UE 102A via SU-MIMO enabled Tx/Rx antennas 104A, 118A; and, pre-coding stack module 116A configured to transmit the multiple, parallel RF signals from AN 110A to UE 102A based on a pre-coding weight (e.g., determined using Pre-Coding Matrix Information (PMI)) via SU-MIMO enabled Tx/Rx antennas 104A, 118A.

Figure 1C:
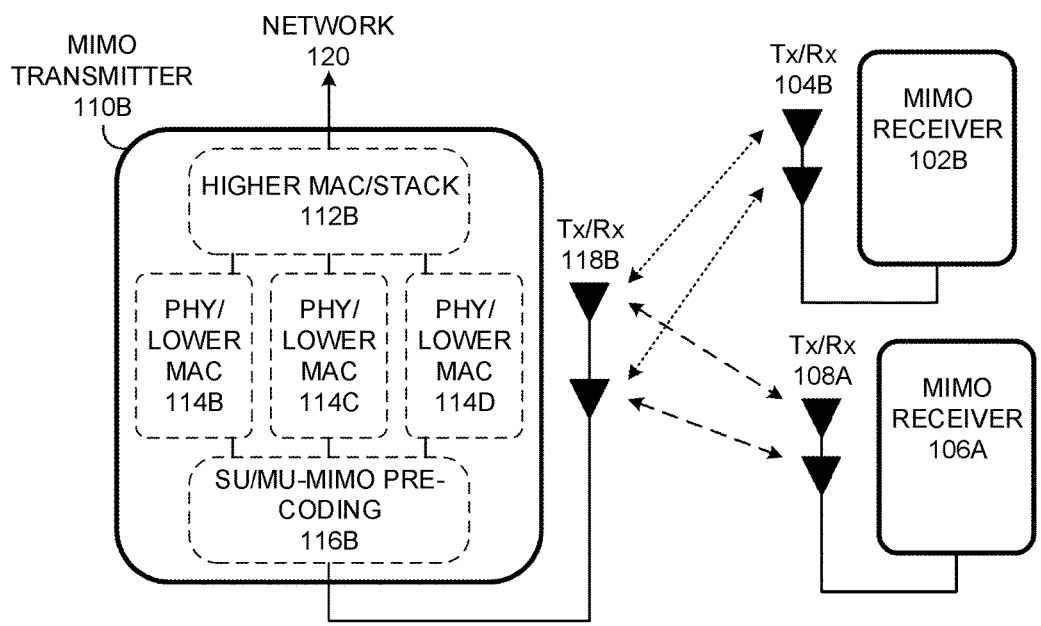
FIG. 1C illustrates an AN of the exemplary communication system illustrated in FIG. 1A operating in SU/MU-MIMO mode.

Referring to FIG. 1C, multiple SU/MU-MIMO enabled Tx/Rx antennas 104B, 108A, 118B are deployed at AN 110B to exploit multipath propagation behaviors (e.g., spatial domain) and/or to support spatial multiplexing, beamforming, and/or transmit diversity. For example, multiple SU/MU-MIMO enabled Tx/Rx antennas 104B, 108A, 118B may be deployed at AN 110B and/or multiple, spatially-separated UEs 102B, 106A of cellular network 120 such that multiple, parallel RF signals (or data streams) are sent to/from UEs 102B, 106A at a same time. On the DL, the RF signals may be spatially pre-coded (i.e., amplitude/phase scaling may be applied to the RF signals) and sent to UEs 102B, 106A from AN 110B concurrently via multiple SU/MU-MIMO enabled Tx/Rx antennas 104B, 108A, 118B. UEs 102B, 106A use the multiple, spatially pre-coded RF signals, which arrive at UEs 102B, 106A from AN 110B with different spatial signatures, to recover RF signals destined for that UE 102B, 106A. On the UL, UEs 102B, 106A can send multiple, spatially pre-coded RF signals at different times and/or from different paths to AN 110B. AN 110B may "combine" the multiple, spatially pre-coded RF signals sent from UEs 102B, 106A on a same RB for UL transmission (e.g., using spatial multiplexing), which effectively increases signal-capturing power at AN 110B. AN 110B uses the multiple, spatially pre-coded RF signals to identify the source, for example, UEs 102B, 106A, of each spatially pre-coded RF signal.

AN 110B may upgrade and/or switch between SU-MIMO and MU-MIMO modes by, for example: configuring higher MAC stack module 112B to coordinate scheduling of multiple, spatially-separated UEs 102B, 106A for an MU-MIMO operation based on CSI sent to AN 110B from UEs 102B, 106A via SU/MU-MIMO enabled Tx/Rx antennas 104B, 108A, 118B; multiplying the data handling functions of lower MAC stack module 114A (illustrated in FIG. 1B) at lower MAC stack modules 114B, 114C, 114D to accommodate the multiple, parallel RF signals sent to AN 110B from the multiple, spatially-separated UEs 102B, 106A via SU/MU-MIMO enabled Tx/Rx antennas 104B, 108A, 118B concurrently; and, modifying pre-coding stack module 116A (including PMI) (illustrated in FIG. 1B) at pre-coding stack module 116B to transmit multiple, parallel RF signals from AN 110B to multiple, spatially-separated UEs 102B, 106A via SU/MU-MIMO enabled Tx/Rx antennas 118B deployed at AN 110B concurrently.

Referring again to FIG. 1A, AN 110 may upgrade and/or switch between SU-MIMO and MU-MIMO modes (illustrated in FIG. 1C). Under a typical SU/MU-MIMO mode, AN 110 may prioritize UEs 102, 106 for pairing (i.e., "combine" or "co-schedule" UEs 102, 106 on a same RB for UL transmission) based on channel orthogonality and/or SINR ratios above a set threshold (i.e., "primary criteria") to increase signal-capturing power (e.g., throughput or sum rate). Channel orthogonality may be achieved by assigning cyclic shifts, allocated to Demodulation Reference Signals (DM-RS), to differentiate multiple, parallel RF signals (or data streams) sent to/received at AN 110 from UEs 102, 106 via SU/MU-MIMO enabled Tx/Rx antennas 124, 126.

In one embodiment, AN 110 collects CSI sent to AN 110 from UEs 102, 106 via SU/MU-MIMO enabled Tx/Rx antennas 124, 126. The collected CSI may include one or more of: Channel Quality Indication (CQI), PMI, ACK/NACK information, and/or Rank Information (RI). AN 110 uses the collected CSI to prioritize UEs 102, 106 for pairing. For example, CSI may be quantized at UEs 102, 106 based on a codebook selected to maximize signal-capturing power (e.g., throughput or sum-rate) based on a pre-coding weight (e.g., determined using PMI) applied to the multiple, parallel RF signals (or data streams) sent to AN 110 from UEs 102, 106 via SU/MU-MIMO enabled Tx/Rx antennas 124, 126. A code word may be selected to represent an UL channel and an index of the code word (e.g., the PMI) may be fed back to AN 110 from UEs 102, 106; the number of bits, B, used for PMI feedback is related to the codebook size. AN 110 uses the CSI and/or PMI from UEs 102, 106 to pre-code the RF signals; PMI may also be used by UEs 102, 106 to determine CQI, which roughly corresponds to SINR. On receipt of the CQI (and SINR), sent from UEs 102, 106, AN 110 applies channel coding rates and/or modulation to the RF signals and selects an associated Modulation and Coding Scheme (MCS) for the UL channel condition. Combined with MCS, CQI (and SINR) can be converted into an expected signal-capturing power (e.g., throughput or sum-rate). The expected signal-capturing power considers, for example, a number of SU/MU-MIMO enabled Rx antennas 124, 126 deployed at AN 110 (i.e., 4 Rx, 8 Rx, etc., may have higher gains than 2 Rx). AN 110 uses the expected signal-capturing power to adjust an operating mode (i.e., SU/MU-MIMO) of AN 110 and/or UEs 102, 106 and/or to allocate RBs to UEs 102, 106.

Additional secondary criteria (i.e., criteria additional to channel orthogonality and/or SINR ratios above a threshold) may be used by AN 110 to pair UEs 102, 106 on a same RB for UL transmission. For example, the additional secondary criteria may include: (i) scheduling UEs 102, 106 on different RBs (regardless of the primary criteria) when there are sufficient RBs in a current Transmission Time Interval (TTI) to schedule the UEs separately; (ii) calculating an expected signal-capturing power gain (e.g., throughput or sum rate) at AN 110 after pairing UEs 102, 106 and, if no gain is found, scheduling UEs 102, 106 separately; (iii) excluding Hybrid-Automatic-Repeat-Request (HARQ) re-transmission UEs 102, 106 from pairing; (iv) requiring a higher priority to pair Non-Giga Bit Rate (Non-GBR) UEs 102, 106; (v) excluding TTI bundling UEs 192, 106 from pairing; (vi) selecting high-speed, low-priority UEs 102, 106 for pairing; and, (vii) excluding cell-edge, TTI bundling UEs 102, 106 from pairing.

Because UL MU-MIMO UE pairing at AN 110 ignores data usage factors, overall network efficiencies and cell-throughput may be reduced. In one embodiment, AN 110 may upgrade and/or switch to MU-MIMO mode (illustrated in FIG. 1C). AN 110 may select UEs 102, 106 with a channel orthogonality above a set threshold as candidates for UL MU-MIMO pairing. AN may use a Deep Packet Inspection (DPI) entity (or other packet sniffer) to detect a traffic type and/or application running on the candidate UEs 102, 106. Based on the DPI, AN 110 may dynamically select UEs 102, 106 whose UL MU-MIMO pairing would maximize average cell-throughput for co-scheduling on a same RB.

FIG. 1A illustrates an exemplary communication system 100 for prioritizing UE selection for SU/MU-MIMO pairing. FIG. 1B illustrates an AN of the exemplary communication system 100 illustrated in FIG. 1A operating in SU-MIMO mode. FIG. 1C illustrates an AN of the exemplary communication system 100 illustrated in FIG. 1A operating in SU/MU-MIMO mode. System 100 can comprise UEs 102, 102A, 102B, 106, 106A, ANs 110, 110A, 110B, cellular network 120, and network node 122. ANs 110, 110A, 110B may include an inspection module (not shown). UEs 102, 102A, 102B, 106, 106A may be connected to ANs 110, 110A, 110B by communication links 124, 126 (illustrated in FIG. 1A). ANs 110, 110A, 110B may be connected to cellular network 120 by communication link 128 (illustrated in FIG. 1A). Cellular network 120 may be connected to network node 122 by communication link 130. Communication links 124, 126, 130 can be wired or wireless and use various communication protocols such as Internet, Internet Protocol (IP), Local-Area Network (LAN), optical networking, Hybrid Fiber Coax (HFC), telephony, T1, or some other communication format—including combinations, improvements or variations thereof. Wireless communication links can be a radio frequency, microwave, infrared, or other similar signal, and can use a suitable communication protocol, for example, Global System for Mobile Communications (GSM), Code Division Multiple Access (CDMA), Worldwide Interoperability for Microwave Access (WiMAX), or Long Term Evolution (LTE), or combinations thereof. Other wireless protocols can also be used. Links 124, 126, 130 can be a direct link or might include various equipment, intermediate components, systems, and networks. The communications between UEs 102, 102A, 102B, 106, 106A may be relayed, monitored, and/or inspected by the inspection module of AN 110, 110A, 110B.

Other network elements may be present in the system 100 to facilitate communication but are omitted for clarity, such as controller nodes, base stations, base station controllers, gateways, Mobile Switching Centers (MSC), Dispatch Application Processors (DAPs), and location registers such as a Home Location Register (HLR) or Visitor Location Register (VLR). Furthermore, other network elements maybe present to facilitate communication, such as between ANs 110, 110A, 110B and cellular network 120, which are omitted for clarity, including additional processing nodes, routers, gateways, and physical and/or wireless data links for carrying data among the various network elements.

UEs 102, 102A, 102B, 106, 106A can be any device configured to communicate over system 100 using a wireless interface. For example, UEs 102, 102A, 102B, 106, 106A can include a remote terminal unit, a cell phone, a smart phone, a computing platform such as a laptop, palmtop, or a tablet, a Personal Digital Assistant (PDA), or an internet access device, and combinations thereof. It is noted that while one or two UEs 102, 102A, 102B, 106, 106A are illustrated in FIGS. 1A-1C as being in communication with ANs 110, 110A, and/or 110B, any number of UEs can be implemented according to various exemplary embodiments disclosed herein.

UEs 102, 102A, 102B, 106, 106A can transmit and/or receive information over system 100 using various communication services. These services can include various voice, data, and/or MBMS services and applications. For example, mobile voice services, mobile data services, Push-to-Talk (PTT) services, internet services, web browsing, email, pictures, picture messaging, video, video messaging, broadcast video, audio, voicemail, music, MP3's, ring tones, stock tickers, news alerts, etc.

ANs 110, 110A, 110B can be any network node configured to provide communication between UEs 102, 102A, 102B, 106, 106A and cellular network 120. ANs 110, 110A, 110B can be standard ANs and/or short range, low-power ANs. A standard AN can be a macrocell AN such as a base transceiver station, a radio base station, an eNodeB device, or an enhanced eNodeB device, or the like. In an exemplary embodiment, a macrocell AN can have a coverage area in the range of approximately five kilometers to thirty-five kilometers and an output power in the tens of watts. A short range AN can include a microcell AN, a picocell AN, a femtocell AN, or the like such as a home NodeB or a home eNodeB device. In an exemplary embodiment, a picocell AN can have a coverage area of approximately a half a kilometer and an output power of less than one watt. In yet another exemplary embodiment, a femtocell AN can have a coverage area in the range of fifty to two-hundred meters and an output power in the range of 0.5 to 2 watts. Femtocell AN can be cellular ANs or WiFi ANs. In addition, a UE configured to enter a hotspot mode can be a femtocell AN. It is noted that while one ANs 110, 110A, 110B is illustrated in each of FIGS. 1A-1C, any number of ANs can be implemented within system 100.

ANs 110, 110A, 110B can comprise a processor and associated circuitry to execute or direct the execution of computer-readable instructions to obtain information. ANs 110, 110A, 110B can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. ANs 110, 110A, 110B can receive instructions and other input at a user interface.

Network node 122 can be any network node configured to communicate information and/or control information over system 100. For example, network node 122 can receive information from or transmit information to UEs 102, 102A, 102B, 106, 106A over system 100. For ease of illustration, network node 122 is shown to be located within the backhaul of the system 100. However, network node 122 could alternatively be between ANs 110, 110A, 110B and cellular network 120. Network node 122 can be a standalone computing device, computing system, or network component, and can be accessible, for example, by a wired or wireless connection, or through an indirect connection such as through a computer network or cellular network. For example, network node 122 can include a Mobility Management Entity (MME), a Home Subscriber Server (HSS), a Policy Control and Charging Rules Function (PCRF), an Authentication, Authorization, and Accounting (AAA) node, a Rights Management Server (RMS), a Subscriber Provisioning Server (SPS), a policy server, etc. One of ordinary skill in the art would recognize that network node 122 is not limited to any specific technology architecture, such as LTE and can be used with any network architecture and/or protocol.

Network node 122 can comprise a processor and associated circuitry to execute or direct the execution of computer-readable instructions to obtain information. Network node 122 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Network node 122 can receive instructions and other input at a user interface.

Cellular network 120 can be a wired and/or wireless communication network, and can comprise processing nodes, routers, gateways, and physical and/or wireless data links for carrying data among various network elements, including combinations thereof, and can include a LAN or Wide-Area Network (WAN), and an internetwork (including the internet). Cellular network 120 can be capable of carrying data, for example, to support voice, PTT, broadcast video, and data communications by a UE such as UEs 102, 102A, 102B, 106, 106A. Wireless network protocols can comprise MBMS, CDMA 1×RTT, GSM, Universal Mobile Telecommunications System (UMTS), High-Speed Packet Access (HSPA), Evolution Data Optimized (EV-DO), EV- DO rev. A, Third Generation Partnership Project Long Term Evolution (3GPP LTE), and WiMAX. Wired network protocols that may be utilized by cellular network 120 comprise Ethernet, Fast Ethernet, Gigabit Ethernet, Local Talk (such as Carrier Sense Multiple Access with collision Avoidance), Token Ring, Fiber Distributed Data Interface (FDDI), and Asynchronous Transfer Mode (ATM). Cellular network 120 can also comprise additional base stations, controller nodes, telephony switches, internet routers, network gateways, computer systems, communication links, or some other type of communication equipment, and combinations thereof.

Figure 2:
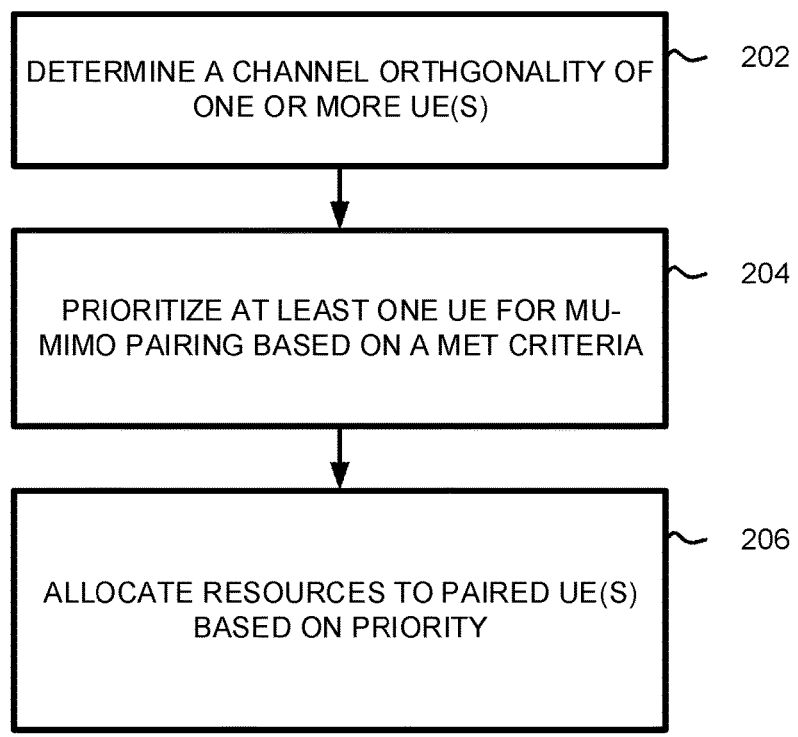
FIG. 2 illustrates a flow chart of an exemplary method for prioritizing UE selection for UL MU-MIMO pairing in a cellular network.

FIG. 2 illustrates a flow chart of an exemplary method for prioritizing UE selection for SU/MU-MIMO pairing in a cellular network. The method will be discussed with reference to the exemplary system 100 illustrated in FIGS. 1A-1C. However, the method for prioritizing UE selection for SU/MU-MIMO pairing illustrated in FIG. 2 can be implemented with any suitable communication system. In addition, although FIG. 2 depicts steps performed in a particular order for purposes of illustration and discussion, the methods discussed herein are not limited to any particular order or arrangement. One skilled in the art, using the disclosure provided herein, will appreciate that various steps of the method can be omitted, rearranged, combined, and/or adapted in various ways.

Referring to FIG. 2, multiple SU/MU-MIMO enabled Tx/Rx antennas 124, 126 may be deployed at AN 110 and/or UEs 102, 106 (illustrated in FIG. 1A) of cellular network 120 such that multiple, parallel RF signals (or data streams) sent at different times and/or from different paths may be "combined" on a same RB for UL transmission (e.g., using spatial multiplexing). For example, at 202, cellular network 120 detects a channel orthogonality (e.g., non-overlapping, non-interfering channels) of UEs 102, 106 above a set threshold. Channel orthogonality may be achieved by, for example, assigning cyclic shifts, allocated to DM-RS, to differentiate the multiple, parallel RF signals sent to/received at AN 110 from UEs 102, 106 via SU/MU-MIMO enabled Tx/Rx antennas 124, 126. AN 110 selects UEs 102, 106 from a pool of potential UEs with a channel orthogonality above a set threshold as candidates for UL MU-MIMO pairing.

At 204, AN 110 uses a Deep Packet Inspection (DPI) entity (or other packet sniffer) that includes a DPI engine (or other network equipment) to inspect (or filter) data traffic being sent to/from candidate UEs 102, 106 (i.e., UEs 102, 106 selected at step 202 from a pool of potential UEs) at an inspection point for a met criteria. AN 110 may inspect the contents of the data traffic (e.g., data packets) sent to/from UEs 102, 106 at layers of the Open Systems Interconnection (OSI) model (e.g., layers 4-7 of the OSI model). AN 110 may log (or store) the inspected contents of the data traffic at storage (not shown) and/or compare the contents to a criteria. Based on a met criteria, the data traffic can be re-routed or dumped. The met criteria can include: a virus and/or prioritization of data packets based on an inspected application and/or traffic type. For example, certain types of applications and/or traffic (illustrated in FIG. 4B) that are extremely bandwidth dependent (e.g., YouTube Video Upload, Facebook Video Upload, Google Cloud Upload, FaceTime, Skype, Periscope, Video Conferencing, Netflix, etc.) may be prioritized (i.e., "high-priority" and/or "medium-priority") over traffic that needs to arrive eventually (e.g., Web Browsing, E-mails (Outlook, Yahoo, Gmail), Bit Torrent, Application Data, etc.), but is not urgent (i.e., "low-priority").

AN 110 may dynamically select UEs 102, 104 from the candidate UEs (i.e., pool of candidate UEs selected at step 202) to be paired (i.e., "combined" or "co-scheduled") on a same RB for UL SU/MU-MIMO transmission. For example, AN 110 may select UEs 102, 106 for UL MU-MIMO pairing based on DPI of the data traffic being sent to/from UEs 102, 106 to maximize average cell-throughput. Because AN 110 only considers the channel orthogonality of UEs 102, 106 and the content of the data traffic (e.g., application and/or traffic type) being sent to/from UEs 102, 106, UEs 102, 106 can be paired on a same RB for UL MU-MIMO transmission within a same QoS Class Indicator (QCI). For example, Non-GBR UEs can be paired with GBR and/or other Non-GBR UEs regardless of priority.

At 206, RBs are allocated to UEs 102, 106 prioritized for UL MU-MIMO pairing. For example, AN 110 may allocate RBs to UEs 102, 106 prioritized for UL MU-MIMO pairing at a scheduler (e.g., higher MAC stack module 112B illustrated in FIG. 1C) and distribute the allocated RBs to UEs 102, 106 via a scheduling algorithm (e.g., proportional fairness, round robin, etc.).

Figure 3:
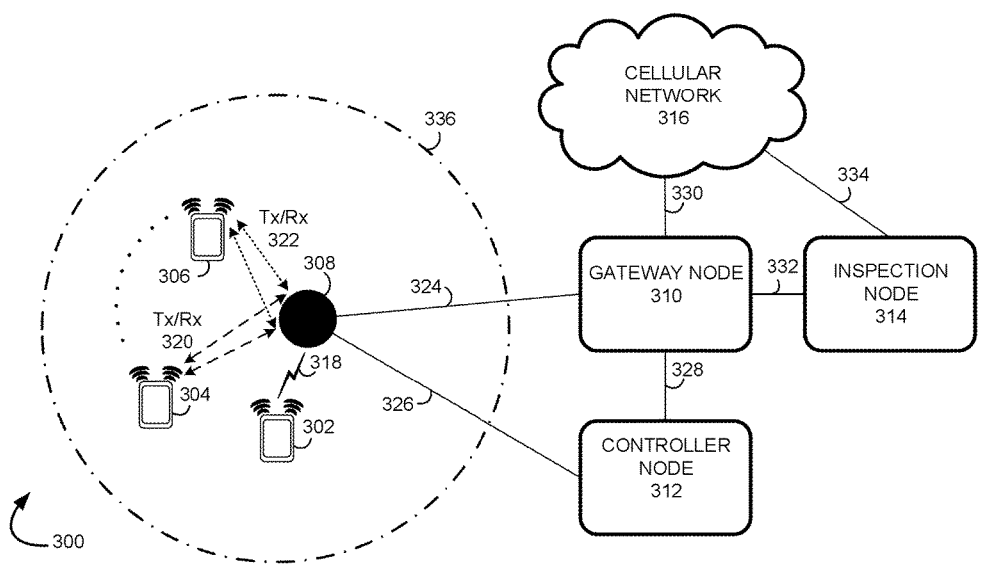
FIG. 3 illustrates another exemplary communication system for prioritizing UE selection for UL MU-MIMO pairing in a cellular network.

FIG. 3 illustrates another exemplary communication system 300 for prioritizing UE selection for UL MU-MIMO pairing. System 300 can comprise UEs 302, 304, 306, AN 308, gateway node 310, controller node 312, inspection node 314, and cellular network 316. AN 308 may include an inspection module (not shown). The communications between UEs 302, 304, 306 and/or AN 308 may be relayed, monitored, and/or inspected by the inspection module of AN 308 and/or inspection node 314.

Other network elements may be present in the communication system 300 to facilitate communication but are omitted for clarity, such as base stations, base station controllers, gateways, MSC, DPAs, and location registers such as a HLR or VLR. Furthermore, other network elements may be present to facilitate communication, such as between AN 308 and cellular network 316, which are omitted for clarity, including additional processing nodes, routers, gateways, and physical and/or wireless data links for carrying data among the various network elements.

UEs 302, 304, 306 can be any device configured to communicate over system 300 using a wireless interface. For example, UEs 302, 304, 306 can include a remote terminal unit, a cell phone, a smart phone, a computing platform such as a laptop, palmtop, or a tablet, a PDA, or an internet access device, and combinations thereof. UEs 302, 304, 306 can include one or more transceivers (e.g., SU/MU-MIMO enabled Tx/Rx antennas 318, 320, 322) for transmitting and receiving data over system 300. Each transceiver can be associated with the same or different frequency bands, the same or different radio access technologies, the same or different network providers, and/or the same or different services. For example, UEs 302, 304, 306 can include Tx/Rx antennas 318, 320, 322 that are associated with one or more of the following: CDMA, GSM, WiMAX, LTE, HSDPA, IEEE 802.11, WiFi, Bluetooth, Zigbee, IrDA, MBMS, etc.

UEs 302, 304, 306 can be connected with AN 308 through communication links 318, 320, 322. Links 318, 320, 322 can use various communication media, such as air, space, metal, optical fiber, or some other signal propagation path—including combinations thereof. Links 318, 320, 322 may comprise many different signals sharing the same link. Links 318, 320, 322 could include multiple signals operating in a single "airpath" comprising beacon signals, user communications, communication sessions, overhead communications, frequencies, timeslots, transportation ports, logical transportation links, network sockets, packets, or communication directions. For example, user communication between UEs 302, 304, 308 and AN 308 could share the same representative wireless link, but be transferred over different communication sessions, frequencies, timeslots, packets, ports, sockets, logical transport links, or in different directions—including combinations thereof.

UEs 302, 304, 306 can transmit and/or receive information over system 300 using various communication services. These services can include various voice, data, and/or MBMS services and applications. For example, mobile voice services, mobile data services, PTT services, internet services, web browsing, email, pictures, picture messaging, video, video messaging, broadcast video, audio, voicemail, music, MP3's, ring tones, stock tickers, new alerts, etc.

AN 308 can be any network node configured to provide communication between UEs 302, 304, 306 and cellular network 316. AN 308 can be a standard AN or a short range, low-power AN. A standard AN can be a macrocell AN such as a base transceiver station, a radio base station, an eNodeB device, or an enhanced eNodeB device, or the like. In an exemplary embodiment, a macrocell AN can have a coverage area in the range of approximately five kilometers to thirty-five kilometers and an output power in the tens of watts. A short range AN can include a microcell AN, a picocell AN, a femtocell AN, or the like such as a home NodeB or a home eNodeB device. In an exemplary embodiment, a picocell AN can have a coverage area of approximately a half a kilometer and an output power of less than one watt. In yet another exemplary embodiment, a femtocell AN can have a coverage area in the range of fifty to two-hundred meters and an output power in the range of 0.5 to 1 watts. Femtocell AN can be cellular AN or WiFi AN. In addition, a UE configured to enter a hotspot mode can be a femtocell AN. It is noted that while one AN 308 is illustrated in FIG. 3, any number of ANs can be implemented within system 300.

AN 308 can comprise a processor and associated circuitry to execute or direct the execution of computer-readable instructions to obtain information. AN 308 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. AN 308 can receive instructions and other input at a user interface.

Gateway node 310 can be any network node configured to interface with other network nodes using various protocols. Gateway node 310 can communicate user data over system 300. Gateway node 310 can be a standalone computing device, computing system, or network component, and can be accessible, for example, by a wired or wireless connection, or through an indirect connection such as through a computer network or cellular network. For example, gateway node 310 can include a Serving Gateway (SGW) and/or a Public Data Network Gateway (PGW), etc. One of ordinary skill in the art would recognize that gateway node 310 is not limited to any specific technology architecture, such as LTE and can be used with any network architecture and/or protocol.

Gateway node 310 can comprise a processor and associated circuitry to execute or direct the execution of computer-readable instructions to obtain information. Gateway node 310 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 310 can receive instructions and other input at a user interface.

Controller node 312 can be any network node configured to communicate information and/or control information over system 300. Controller node 312 can be configured to transmit control information associated with a handover procedure. Controller node 312 can be a standalone computing device, computing system, or network component, and can be accessible, for example, by a wired or wireless connection, or through an indirect connection such as through a computer network or cellular network. For example, controller node 312 can include a MME, a HSS, a PCRF, an AAA node, a RMS, a SPS, a policy server, etc. One of ordinary skill in the art would recognize that controller node 312 is not limited to any specific technology architecture, such as LTE and can be used with any network architecture and/or protocol.

Controller node 312 can comprise a processor and associated circuitry to execute or direct the execution of computer-readable instructions to obtain information. Controller node 312 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 312 can receive instructions and other input at a user interface.

Inspection node 314 can comprise a processor and associated circuitry to execute or direct the execution of a DPI entity (or other packet sniffer entity) and/or computer-readable instructions to obtain information. Inspection node 314 can retrieve and execute software from storage, which can include a disk drive, a flash drive, memory circuitry, or some other memory device, and which can be local or remotely accessible. The software comprises computer programs, firmware, or some other form of machine readable instructions, and may include an operating system, utilities, drivers, network interfaces, applications, or some other type of software, including combinations thereof. Inspection node 314 can receive instructions and other input at a user interface.

In an exemplary embodiment, inspection node 314 can be configured to relay, monitor, and/or inspect communications between UEs 302, 304, 306 and cellular network 316. For example, inspection node 314 may use a DPI entity (or other packet sniffer) that includes a DPI engine (or other network equipment) to inspect (or filter) data traffic being sent to/from candidate UEs 302, 304, 306 (i.e., UEs 304, 306 selected from a pool of potential UEs) for a met criteria. Inspection node 314 may inspect the contents of data traffic (e.g., data packets) sent to/from UEs 304, 306 and/or AN 308 at layers of the OSI model (e.g., layers 4-7 of the OSI model). Inspection node 314 may log (or store) the inspected contents of the data traffic at storage (not shown).

AN 308 may be connected with gateway node 310 through communication link 314 and with controller node 312 through communication link 326. Gateway node 310 may be connected with controller node 312 through communication link 328, with inspection node 314 through communication link 332, and with cellular network 316 through communication link 330. Inspection node 314 may be connected with cellular network 316 through communication link 334. Links 324, 326, 328, 330, 332, 334 can be wired or wireless and use various communication protocols such as Internet, IP, LAN, optical networking, HFC, telephony, T1, or some other communication format—including combinations, improvements, or variations thereof. Links 324, 326, 328, 330, 332, 334 can be a RF, microwave, infrared, or other similar signal, and can use a suitable communication protocol, for example, GSM, CDMA, WiMAX, or LTE, or combinations thereof. Other wireless protocols can also be used. Links 324, 326, 328, 330, 332, 334 can be a direct link or might include various equipment, intermediate components, systems, and networks. The communications between UEs 302, 304, 306 and AN 308 and/or cellular network 316 may be relayed, monitored, and/or inspected by inspection node 314.

Cellular network 316 can be a wired and/or wireless communication network, and can comprise processing nodes, routers, gateways, and physical and/or wireless data links for carrying data among various network elements, including combinations thereof, and can include a LAN or WAN, and an internetwork (including the internet). Cellular network 316 can be capable of carrying data, for example, to support voice, PTT, broadcast video, and data communications by a UE such as UEs 302, 304, 306. Wireless network protocols can comprise MBMS, CDMA 1×RTT, GSM, UMTS, HSPA, EV-DO, EV-DO rev. A, 3GPP LTE, and WiMAX. Wired network protocols that may be utilized by cellular network 316 comprise Ethernet, Fast Ethernet, Gigabit Ethernet, Local Talk (such as Carrier Sense Multiple Access with Collision Avoidance), Token Ring, FDDI, ATM. Cellular network 316 can also comprise additional base stations, controller nodes, telephony switches, internet routers, network gateways, computer systems, communication links, or some other type of communication equipment, and combinations thereof.

Referring to FIG. 3, multiple SU/MU-MIMO enabled Tx/Rx antennas 318, 320, 322 may be deployed at AN 308 and/or UEs 302, 304, 306 of cellular network 316 such that multiple, parallel RF signals (or data streams) sent to/from UEs 318, 320, 322 at different times and/or from different paths may be "combined" on a same RB for UL MU-MIMO transmission (e.g., using spatial multiplexing), which effectively increases signal capturing power (i.e., more bits per second per frequency range or Hz of bandwidth) at AN 308 and/or UEs 318, 320, 322 to improve link quality and/or reliability (i.e., reduce fading).

For example, AN 308 may upgrade and/or switch between SU-MIMO and MU-MIMO modes (illustrated in FIG. 1C). In MU-MIMO mode, AN 308 may select UEs 302, 304, 306 with a channel orthogonality above a set threshold as candidates for UL MU-MIMO pairing (i.e., "combine" or "co-schedule" UEs 302, 304, 306 on a same RB for UL transmission). AN 308 may use a DPI entity (or other packet sniffer) at AN 308 and/or inspection node 314 to inspect data traffic (e.g., data packets) sent to/from UEs 302, 304, 306. AN 308 and/or inspection node 314 may prioritize and/or dynamically select UEs 304, 306 for UL MU-MIMO pairing based on the contents of the inspected data traffic. For example, UEs 304, 306 operating certain types of applications and/or traffic that are extremely bandwidth dependent (e.g., YouTube Video Upload, Facebook Video Upload, Google Cloud Upload, FaceTime, Skype, Periscope, Video Conferencing, Netflix, etc.) may be prioritized for UL MU-MIMO pairing over UEs 302 operating applications and/or traffic that needs to arrive eventually (e.g., Web Browsing, E-mails (Outlook, Yahoo, Gmail), Bit Torrent, Application Data, etc.), but is not urgent. RBs may be allocated to UEs 304, 306 prioritized for UL MU-MIMO pairing at a scheduler (e.g., higher MAC stack module 112B illustrated in FIG. 1C) of AN 308. AN 308 may distribute the allocated RBs to UEs 304, 306 via a scheduling algorithm (e.g., proportional fairness, round robin, etc.).

Figure 4A:
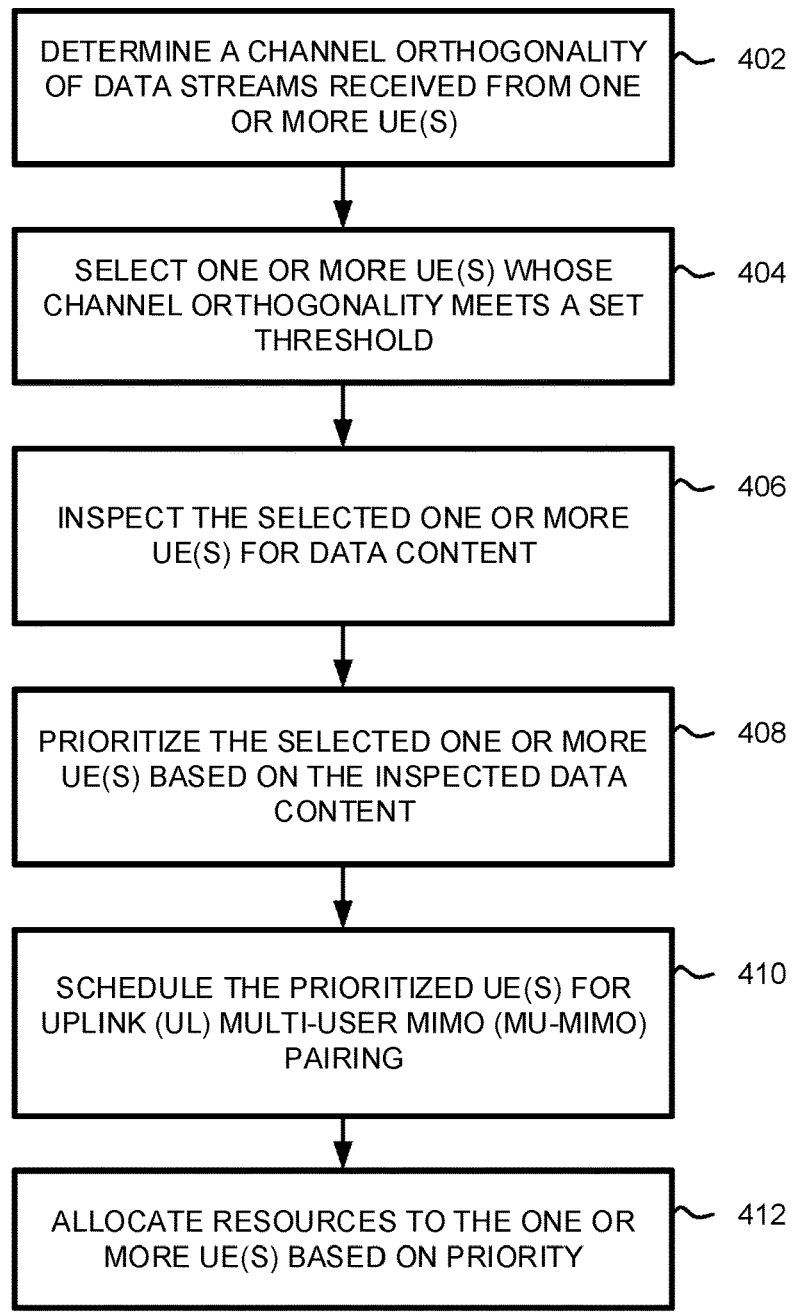
FIG. 4A illustrates another flow chart of an exemplary method for prioritizing UE selection for UL MU-MIMO pairing in a cellular network.

FIG. 4A illustrates a flow chart of an exemplary method for prioritizing UE selection for UL MU-MIMO pairing in a cellular network. The method will be discussed with reference to the exemplary system 300 illustrated in FIG. 3. But, the method for prioritizing UE selection for UL MU-MIMO pairing illustrated in FIG. 4A can be implemented in the exemplary system 100 illustrated in FIGS. 1A and 1B, or with any suitable communication system. In addition, although FIG. 4A depicts steps performed in a particular order for purposes of illustration and discussion, the methods discussed herein are not limited to any particular order or arrangement. One skilled in the art, using the disclosure provided herein, will appreciate that various steps of the method can be omitted, rearranged, combined, and/or adapted in various ways.

Referring to FIG. 4A, multiple SU/MU-MIMO enabled Tx/Rx antennas 318, 320, 322 may be deployed at AN 308 and/or UEs 302, 304, 306 of cellular network 316 such that multiple, parallel RF signals (or data streams) sent to/from UEs 302, 304, 306 at different times and/or from different paths may be "combined" on a same RB for UL transmission (e.g., using spatial multiplexing).

For example, at 402, cellular network 120 via AN 308 detects a channel orthogonality (e.g., non-overlapping, non-interfering channels) of one or more UEs 302, 304, 306 operating in a coverage area 336 of AN 308. Channel orthogonality may be achieved by, for example, assigning cyclic shifts, allocated to DM-RS, to differentiate the multiple, parallel RF signals sent to/received at AN 308 from UEs 302, 304, 306 via SU/MU-MIMO enabled Tx/Rx antennas 318, 320, 322.

At 404, AN 308, operating in MU-MIMO mode, selects one or more UEs 302, 304, 306 from a pool of potential UEs (operating in coverage area 336) with a channel orthogonality above a set threshold as candidates for UL MU-MIMO pairing (i.e., "combine" or "co-schedule" UEs 302, 304, 306 on a same RB for UL transmission). That is, AN 308 selects UEs 302, 304, 306 operating in a coverage area 336 of AN 308 for UL MU-MIMO pairing that satisfy a channel orthogonality condition.

At 406, AN 308 and/or inspection node 314 uses a DPI entity (or other packet sniffer) that includes a DPI engine (or other network equipment) to inspect (or filter) data traffic being sent to/from candidate UEs 302, 304, 306 whose channel orthogonality satisfies the channel orthogonality condition (i.e., UEs 302, 304, 306 selected at step 404 from a pool of potential UEs) at an inspection point for a met criteria. For example, AN 308 and/or inspection node 314 may inspect the contents of the data traffic (e.g., data packets) sent to/from UEs 302, 304, 306 at layers of the OSI model (e.g., layers 4-7 of the OSI model). AN 308 and/or inspection node 314 may log (or store) the inspected contents of the data traffic at storage 508 (illustrated in FIG. 5).

At 408, AN 308 and/or inspection node 314 may prioritize and/or dynamically select UEs 304, 306 for UL MU-MIMO pairing based on the contents of the inspected data traffic. For example, UEs 304, 306 operating certain types of applications and/or data traffic that are extremely bandwidth dependent (e.g., YouTube Video Upload, Facebook Video Upload, Google Cloud Upload, FaceTime, Skype, Periscope, Video Conferencing, Netflix, etc.) may be prioritized for UL MU-MIMO pairing (i.e., "high-priority" and/or "medium-priority") over UEs 302 operating applications and/or traffic that needs to arrive eventually (e.g., Web Browsing, E-mails (Outlook, Yahoo, Gmail), Bit Torrent, Application Data, etc.), but is not urgent (i.e., "low-priority"). Cellular network 316 prioritizes applications and/or traffic (i.e., "high-priority," "medium-priority," and/or "low-priority") based on preference of service, traffic volume, and/or popularity (illustrated in FIG. 4B).

AN 308 and/or inspection node 314 may dynamically select UEs 304, 306 from candidate UEs (i.e., pool of candidate UEs 302, 304, 306 selected at step 404) to be paired (i.e., "combined" or "co-scheduled") on a same RB for UL MU-MIMO transmission based on DPI of the data traffic being sent to/from UEs 302, 304, 306 to maximize average cell-throughput. Because AN 308 considers only the channel orthogonality of UEs 302, 304, 306 and the content of the data traffic (e.g., application and/or data type) being sent to/from UEs 302, 304, 306, UEs 304, 306 can be paired on a same RB for UL MU-MIMO transmission within a same QCI. For example, Non-GBR UEs can be paired with GBR and/or other Non-GBR UEs regardless of priority.

AN 308 may elect to consider other secondary criteria for selecting UEs 304, 306 for pairing. These secondary criteria (i.e., criteria additional to channel orthogonality and data content) may include: (i) SINR above a set threshold; (ii) scheduling UEs 302, 304, 306 on different RBs (regardless of the primary criteria) when there are sufficient RBs in a current TTI to schedule UEs 302, 304, 306 separately; (iii) calculating an expected signal-capturing power gain (e.g., throughput or sum rate) at AN 308 after pairing UEs 304, 306 and, if no gain is found, scheduling UEs 302, 304, 306 separately; (iv) excluding HARQ re-transmission UEs 304 from pairing; (v) requiring a higher priority to pair Non-GBR UEs 306; (vi) excluding TTI bundling UEs 302, 304 from pairing; (vii) selecting high-speed, low-priority UEs 304, 306 for pairing; and (viii) excluding cell-edge, TTI bundling UEs 302, 304 from pairing.

At 410 and 412, AN 308 may allocate RBs to UEs 304, 306 prioritized for UL MU-MIMO pairing at a scheduler (e.g., higher MAC stack module 112B illustrated in FIG. 1C) and distribute the allocated RBs to UEs 304, 306 via a scheduling algorithm (e.g., proportional fairness, round robin, etc.). After RBs have been allocated to UEs 304, 306 paired for UL MU-MIMO, AN 308 may allocate and/or distribute remaining RBs to other UEs 302 operating in a coverage area 336 of AN 308 via the scheduler.

Figure 5:
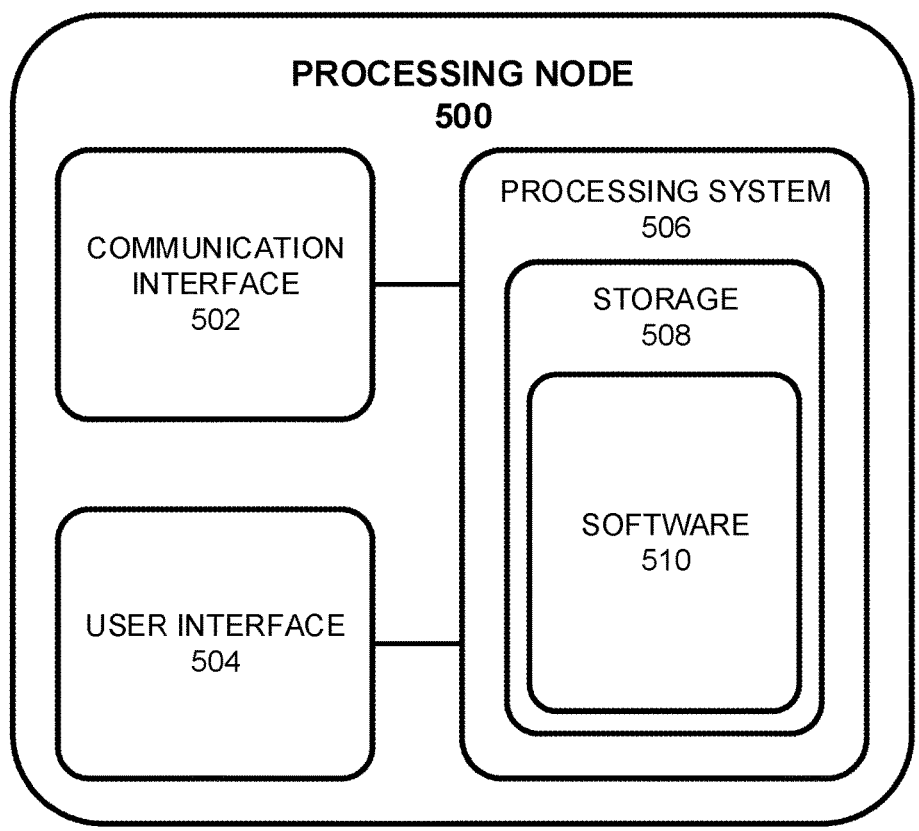
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 can be configured to determine a communication AN for a UE. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include ANs 110, 110A, 110B, 308, network node 122, gateway node 310, and controller node 312, and inspection node 314. Processing node 500 can also be an adjunct or component of a network element, such as an element of ANs 110, 110A, 110B, 308, gateway node 310, and controller node 312, and inspection node 314. Processing node 500 can also be another network element in a communication system. Further, the functionality of processing node 500 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for selecting wireless devices for pairing in a cellular network, the method comprising:
   determining, at an access node, that a channel orthogonality of a plurality of wireless devices meets a threshold;
   inspecting, at the access node, data content of signals received from the plurality of wireless devices using Deep Packet Inspection (DPI) to determine an application type associated with the data content, wherein the application type has a priority level associated with bandwidth dependency;

selecting, at the access node, two or more of the plurality of wireless devices for Uplink (UL) Multi-User Multiple-Input-Multiple-Output (MU-MIMO) pairing that are transmitting uplink data associated with the same application type, and that have the channel orthogonality that meets the threshold; and scheduling, at the access node, the two or more of the plurality of wireless devices that are selected for UL MU-MIMO pairing on a same resource block (RB) within a same quality of service class indicator (QCI), wherein the scheduling comprises combining multiple, parallel radiofrequency (RF) signals sent from the two or more of the plurality of wireless devices.

2. The method of claim 1, wherein cyclic shifts are assigned to multiple, parallel data streams sent from the plurality of wireless devices to an access node, the cyclic shifts being used to determine the channel orthogonality of the plurality of wireless devices.

3. The method of claim 1, wherein the two or more of the plurality of wireless devices are selected as candidates from a pool of potential wireless devices.

4. The method of claim 1, wherein the access node inspects the data content of the plurality of wireless devices at layers 4-7 of an Open Systems Interconnection (OSI) model.

5. A system for selecting wireless devices for pairing in a cellular network, the system comprising:
a processing node comprising a processor configured to:
determine that a channel orthogonality of a plurality of wireless devices meets a threshold;
inspect data content of signals received from the plurality of wireless devices using Deep Packet Inspection (DPI) to determine an application type associated with the data content, wherein the application type has a priority level associated with bandwidth dependency;
select, at the processing node, two or more of the plurality of wireless devices for Uplink (UL) Multi-User Multiple-Input-Multiple-Output (MU-MIMO) pairing that are transmitting uplink data associated with the same application type, and that have the channel orthogonality that meets the threshold; and
schedule resources to the two or more of the plurality of wireless devices that are selected for UL MU-MIMO pairing on a same resource block (RB) within a same quality of service class indicator (QCI), wherein the scheduling comprises combining multiple, parallel radiofrequency (RF) signals sent from the two or more of the plurality of wireless devices.

6. The system of claim 5, wherein the processing node is further configured to assign cyclic shifts to multiple, parallel data streams sent from the plurality of wireless devices, the cyclic shifts being used to determine the channel orthogonality of the plurality of wireless devices.

7. The system of claim 5, wherein the two or more of the plurality of wireless devices are selected as candidates from a pool of potential wireless devices.

8. The system of claim 5, wherein the processing node inspects the data content of the plurality of wireless devices at layers 4-7 of an Open Systems Interconnection (OSI) model.

9. A method for selecting a wireless device to share a set of resource blocks from an access node, the method comprising:
determining a channel orthogonality of multiple, parallel data streams received at the access node from a plurality of wireless devices;
inspecting data content of the data streams received from the plurality of wireless devices using Deep Packet Inspection (DPI) to determine an application type associated with the data content, wherein the application type has a priority level associated with bandwidth dependency;
selecting, from the plurality of wireless devices, two or more of the plurality of wireless devices for Uplink (UL) Multi-User Multiple-Input-Multiple-Output (MU-MIMO) pairing that are transmitting uplink data associated with the same application type, and that have the channel orthogonality that meets a set threshold; and
scheduling the two or more of the plurality of wireless devices that are selected for UL MU-MIMO pairing on a same resource block (RB) within a same quality of service class indicator (QCI), wherein the scheduling comprises combining multiple, parallel radiofrequency (RF) signals sent from the two or more of the plurality of wireless devices.

* * * * *